(12) United States Patent
Boscaroli et al.

(10) Patent No.: US 12,474,673 B2
(45) Date of Patent: Nov. 18, 2025

(54) TIMEPIECE MECHANISM INDICATING A MAXIMUM VALUE OF A MEASURED PHYSICAL VARIABLE AND TIMEPIECE COMPRISING SUCH A MECHANISM

(71) Applicant: BLANCPAIN SA, Le Brassus (CH)

(72) Inventors: Guillaume Boscaroli, Le Solliat (CH); Bernat Monferrer, St-Prex (CH)

(73) Assignee: BLANCPAIN SA, Le Brassus (CH)

( * ) Notice: Subject to any disclaimer, the term of this patent is extended or adjusted under 35 U.S.C. 154(b) by 861 days.

(21) Appl. No.: 17/740,462

(22) Filed: May 10, 2022

(65) Prior Publication Data
US 2023/0047315 A1    Feb. 16, 2023

(30) Foreign Application Priority Data
Aug. 10, 2021   (EP) .................................... 21190613

(51) Int. Cl.
*G04B 47/06*   (2006.01)
*G04B 13/02*   (2006.01)

(52) U.S. Cl.
CPC ......... *G04B 47/066* (2013.01); *G04B 13/027* (2013.01)

(58) Field of Classification Search
CPC .... G04B 47/066; G04B 13/027; G04B 18/02; G04B 19/02
USPC .......................................................... 368/11
See application file for complete search history.

(56) References Cited

U.S. PATENT DOCUMENTS

| 6,385,134 | B1* | 5/2002 | Lange | G01L 19/16 |
| | | | | 73/299 |
| 7,778,115 | B2* | 8/2010 | Ruchonnet | G04B 47/066 |
| | | | | 368/101 |
| 7,869,308 | B2* | 1/2011 | Rochat | G04G 21/02 |
| | | | | 368/80 |
| 2017/0131097 | A1* | 5/2017 | Gilomen | B63C 11/02 |

(Continued)

FOREIGN PATENT DOCUMENTS

| CH | 707 513 | B1 | 11/2016 | |
| CH | 712967 | A2 * | 3/2018 | ........... G04B 47/066 |
| CH | 713474 | A2 * | 8/2018 | ........... G04B 45/003 |

(Continued)

OTHER PUBLICATIONS

Andres (CH-712967-A2) Machine Translation (Year: 2018).*
European Search Report of EP 21 19 0613 dated Feb. 23, 2022.

*Primary Examiner* — Regis J Betsch
*Assistant Examiner* — Kevin Andrew Johnston
(74) *Attorney, Agent, or Firm* — Sughrue Mion, PLLC

(57) ABSTRACT

Provided is an ambient physical variable measuring device (5) including an element configured to mechanically deform under the effect of a variation of a physical variable to rotate a physical variable measured value indication train including a physical variable maximum value display wheel (21). An indexing mechanism (40) to index the position of a physical variable maximum value display train (24) at each advance, the indexing mechanism (40) comprising a blocking organ (41) cooperating with an indexing wheel assembly (43). The the indexing wheel assembly (43) is kinematically connected to the physical variable maximum value display wheel (21) by a gear train T1, T2 and in that the gear ratio of the gear train T1, T2 between the physical variable maximum value display wheel (21) and the indexing wheel assembly (43) is a multiplication ratio.

19 Claims, 3 Drawing Sheets

(56) References Cited

U.S. PATENT DOCUMENTS

2018/0120770 A1* 5/2018 Breuilh ................. G04B 13/02

FOREIGN PATENT DOCUMENTS

| CH | 715502 A2 * | 4/2020 | ........... G04B 47/063 |
| EP | 3 168 694 A1 | 5/2017 | |

* cited by examiner

TIMEPIECE MECHANISM INDICATING A MAXIMUM VALUE OF A MEASURED PHYSICAL VARIABLE AND TIMEPIECE COMPRISING SUCH A MECHANISM

CROSS REFERENCE TO RELATED APPLICATIONS

This application claims priority to European Patent Application No. 21190613.6, filed on Aug. 10, 2021, the entire contents of which are incorporated herein by reference.

TECHNICAL FIELD OF THE INVENTION

The field of the invention relates to timepiece mechanisms for measuring information relating to a physical variable and for indicating a maximum value reached of this information.

More particularly, the invention relates to timepiece mechanisms for measuring information relating to the ambient pressure and for indicating the maximum pressure reached, for example during a dive, or the maximum altitude reached for example during an ascent.

The invention also relates to a horological movement comprising such a timepiece mechanism.

The invention also relates to a depth gauge integrating such a timepiece mechanism.

The invention also relates to an altimeter or a barometer integrating such a timepiece mechanism.

The invention also relates to a timepiece, such as for example a diving watch or an altimeter watch, comprising a horological movement comprising such a timepiece mechanism.

TECHNOLOGICAL BACKGROUND

In the field of depth gauges or timepieces for measuring the ambient pressure, mechanisms are known comprising an ambient pressure measuring device associated with an indicator organ intended to display the maximum pressure reached, or information equivalent to this maximum pressure. These timepieces are most frequently used as diving watches.

Such depth gauges, or diving watches, make it possible to store in memory the value of the maximum pressure reached, particularly during one or more successive dives, so long as the indicator organ is not reset to zero, by a mechanism dedicated to this function. This maximum pressure information is particularly important for the diver because it determines the duration and the depth of the stops during the ascent. Consequently, it is important that this data is accurate.

Such timepiece mechanisms are known comprising a mechanical device for measuring the ambient pressure driving an instantaneous pressure indicator organ and a fly-back hand intended to display the maximum pressure reached, said instantaneous depth indicator organ having a driving element abutting against the fly-back hand in such a way as to move it, during the measurement of an ambient pressure increase, up to the position reached by the instantaneous depth indicator organ. The displacement in the opposite direction of the fly-back hand is blocked by means of a removable blocking element that can be actuated by the user. The blocking element is produced by the cooperation of a removable pawl and of a wheel having a wolf-tooth toothing integral with the fly-back hand. Such a mechanism is for example described in the document EP0942339.

Timepiece mechanisms are also known comprising a gear train linked to a pressure measuring device comprising a first wheel assembly arranged so as to drive a second coaxial wheel assembly during an increase of the ambient pressure and to be uncoupled from this second wheel assembly during an ambient pressure reduction, the first wheel assembly cooperating with a first instantaneous ambient pressure indicator organ and the second wheel assembly cooperating with a second maximum ambient pressure reached indicator organ, integral with a blocking toothed wheel. The blocking toothed wheel cooperates with a blocking organ (such as a pawl or a jumper) in such a way as to block the position of the organ indicating the maximum ambient pressure reached at each advance of the second wheel assembly.

These mechanisms of simple design make it possible to easily perform a function of indicating the maximum pressure reached. However, the use of an indexing pawl, or of a jumper, and of a toothed wheel involves a displacement by incrementation of the maximum pressure indicator organ with a fixed incrementation pitch leading to two major drawbacks. Firstly, the maximum pressure display accuracy is linked to the angular pitch of the toothed wheel, that is to say to the angle formed by the axes passing through the centre and by two tips of consecutive teeth of the toothed wheel. Subsequently, when the organ indicating the maximum outside pressure reached is between two stable indexed positions of the toothed wheel, it will come back to its preceding stable indexing position during an ambient pressure reduction. Which also involves an uncertainty on the maximum pressure actually measured and therefore on the depth actually reached by the diver. This inaccuracy is becoming increasingly difficult to accept by users, particularly faced with the accuracy provided by digital depth gauges for example.

To remedy these drawbacks, another type of mechanism has been developed wherein the instantaneous ambient pressure indicator train pushes a maximum pressure reached indicator train by means of a friction train. Thus, during a reduction of the ambient pressure, the maximum pressure reached indicator organ remains at its position thanks to the friction force of the friction train greater than a return tension. A zero-reset function makes it possible to release the friction train and the return tension realigns the maximum pressure reached indicator organ with the instantaneous ambient pressure indicator organ.

Although this mechanism makes it possible to improve the display accuracy of the maximum pressure reached indicator organ, it has the drawback of being voluminous and of increasing the thickness of the timepiece.

Consequently, to date designers, particularly watchmakers, are confronted between choosing an accurate mechanism of significant thickness or a less accurate mechanism that favours compactness.

Such a problem may also exist for measured information other than the ambient pressure.

SUMMARY OF THE INVENTION

In this context, the invention proposes a timepiece mechanism making it possible to meet at least one problem raised above.

To this end, the invention proposes a timepiece mechanism comprising:
  an ambient physical variable measuring device comprising an element configured to mechanically deform under the effect of a variation of said physical variable;

a physical variable measured value indication train kinematically linked to the physical variable measuring device, in such a way as to be rotated under the effect of a variation of the ambient value of the physical variable;

a physical variable maximum value indication mechanism comprising a physical variable maximum value display train comprising a physical variable maximum value display wheel, said physical variable maximum value indication mechanism comprising a physical variable maximum value indicator organ integral with the physical variable maximum value display wheel;

a drive mechanism configured to gradually drive the physical variable maximum value display train during an increase of the ambient physical variable;

an indexing mechanism to index the position of the physical variable maximum value display train at each advance, the indexing mechanism comprising a blocking organ cooperating with an indexing wheel assembly;

the timepiece mechanism being characterised in that the indexing wheel assembly is kinematically connected to the physical variable maximum value display wheel by a gear train T1, T2 and in that the gear ratio of the gear train T1, T2 between the physical variable maximum value display wheel and the indexing wheel assembly is a multiplication ratio.

Advantageously, the physical variable measured is the ambient pressure.

The timepiece mechanism according to the invention thus makes it possible to improve the display resolution of the maximum value of the physical variable while proposing a compact mechanism and eliminating the use of a friction mechanism.

The use of a multiplication ratio of the gear train between the physical variable maximum value display wheel and the indexing wheel assembly advantageously makes it possible to propose an indexing mechanism by incrementation with a multiplication of indexing positions in relation to existing mechanisms of the prior art, while proposing a mechanism having an ease of implementation and a compactness for easy integration in a horological movement for example.

Apart from the features mentioned in the preceding paragraph, the timepiece mechanism according to the invention may have one or more additional features from the following, considered individually or according to all technically possible combinations:

the indexing wheel assembly comprises a central indexing pinion meshed with the physical variable maximum value display wheel, such that said gear train T1 is formed by the cooperation of the physical variable maximum value display wheel and of the central indexing pinion;

the indexing mechanism comprises an intermediate indexing wheel assembly inserted between the physical variable maximum value display wheel and the indexing wheel assembly such that said gear train T2 is formed by the cooperation between the physical variable maximum value display wheel, the intermediate indexing wheel assembly and the indexing wheel assembly; thus, the intermediate indexing wheel assembly acts as an intermediate wheel (setting-wheel) and makes it possible to offset the indexing wheel assembly from the wheel assembly of the physical variable maximum value indicator organ, which makes it possible to install more easily the mechanism according to the invention;

the indexing wheel assembly comprises a central indexing pinion meshed with the intermediate indexing wheel assembly, such that said gear train T2 is formed by the cooperation between the physical variable maximum value display wheel, the intermediate indexing wheel assembly and the central indexing pinion;

the indexing wheel assembly comprises an indexing toothed wheel integral with the central indexing pinion;

said indexing toothed wheel comprises an asymmetric toothing, preferably a wolf-tooth toothing, said blocking organ cooperating with the asymmetric toothing of the indexing toothed wheel;

said indexing toothed wheel comprises a toothed sector less than 360°, such that said indexing toothed wheel comprises at least one angular sector devoid of at least one indexing tooth;

said at least one angular sector devoid of at least one indexing tooth is positioned close to a reference indexing position of the indexing wheel assembly;

the blocking organ is a blocking organ that can be uncoupled via a zero-reset lever.

the indexing mechanism comprises a return organ configured to ensure a repositioning of the physical variable maximum value display train under the effect of a return element;

the return organ cooperates with the indexing wheel assembly;

the return organ cooperates with the intermediate indexing wheel assembly;

the return organ cooperates with an intermediate indexing pinion of the intermediate indexing wheel assembly;

the drive mechanism comprises a first wheel assembly, known as driver wheel assembly, integral with an arbor, meshed with the physical variable measured value indication train, and a second wheel assembly, freely mounted about the arbor of the first wheel assembly, known as follower wheel assembly, said second wheel assembly being meshed with the physical variable maximum value indication train, said first wheel assembly being configured to drive the second wheel assembly during an increase of the value of the ambient physical variable;

the drive mechanism comprises a drive pin integral with the first wheel assembly cooperating with an opening arranged in the second wheel assembly.

Advantageously, the timepiece mechanism comprises:

an ambient pressure measuring device comprising an element configured to mechanically deform under the effect of a pressure variation;

a measured pressure indication train kinematically linked to the pressure measuring device, in such a way as to be rotated under the effect of a variation of the ambient pressure;

a maximum pressure indication mechanism comprising a maximum pressure display train comprising a maximum pressure display wheel, said maximum pressure indication mechanism comprising a maximum pressure indicator organ integral with the maximum pressure display wheel;

a drive mechanism configured to gradually drive the maximum pressure display train during an increase of the ambient pressure;

an indexing mechanism to index the position of the maximum pressure display train at each advance, the indexing mechanism comprising a blocking organ cooperating with an indexing wheel assembly;

the timepiece mechanism being characterised in that the indexing wheel assembly is kinematically connected to the maximum pressure display wheel by a gear train T1, T2 and in that the gear ratio of the gear train T1, T2 between the maximum pressure display wheel and the indexing wheel assembly is a multiplication ratio.

Another object of the invention is a depth gauge comprising a timepiece mechanism according to the invention.

Another object of the invention is a depth gauge, an altimeter or a barometer comprising a timepiece mechanism according to the invention Another object of the invention is an electronic or electromechanical horological movement comprising a timepiece mechanism according to the invention.

Another object of the invention is a timepiece, such as a diving watch, an altimeter watch or a barometer watch, comprising a horological movement according to the invention.

Preferably, the timepiece is a diving watch.

BRIEF DESCRIPTION OF THE FIGURES

The aims, advantages and features of the present invention will become apparent upon reading the following detailed description making reference to the following figures.

In all of the figures, the common elements bear the same reference numbers unless otherwise specified.

DETAILED DESCRIPTION OF THE INVENTION

Generally, in the field of horology, and in the present application, the term arbor designates a part having the shape of a cylinder that generally supports a toothed wheel or a pinion.

Figure 1:
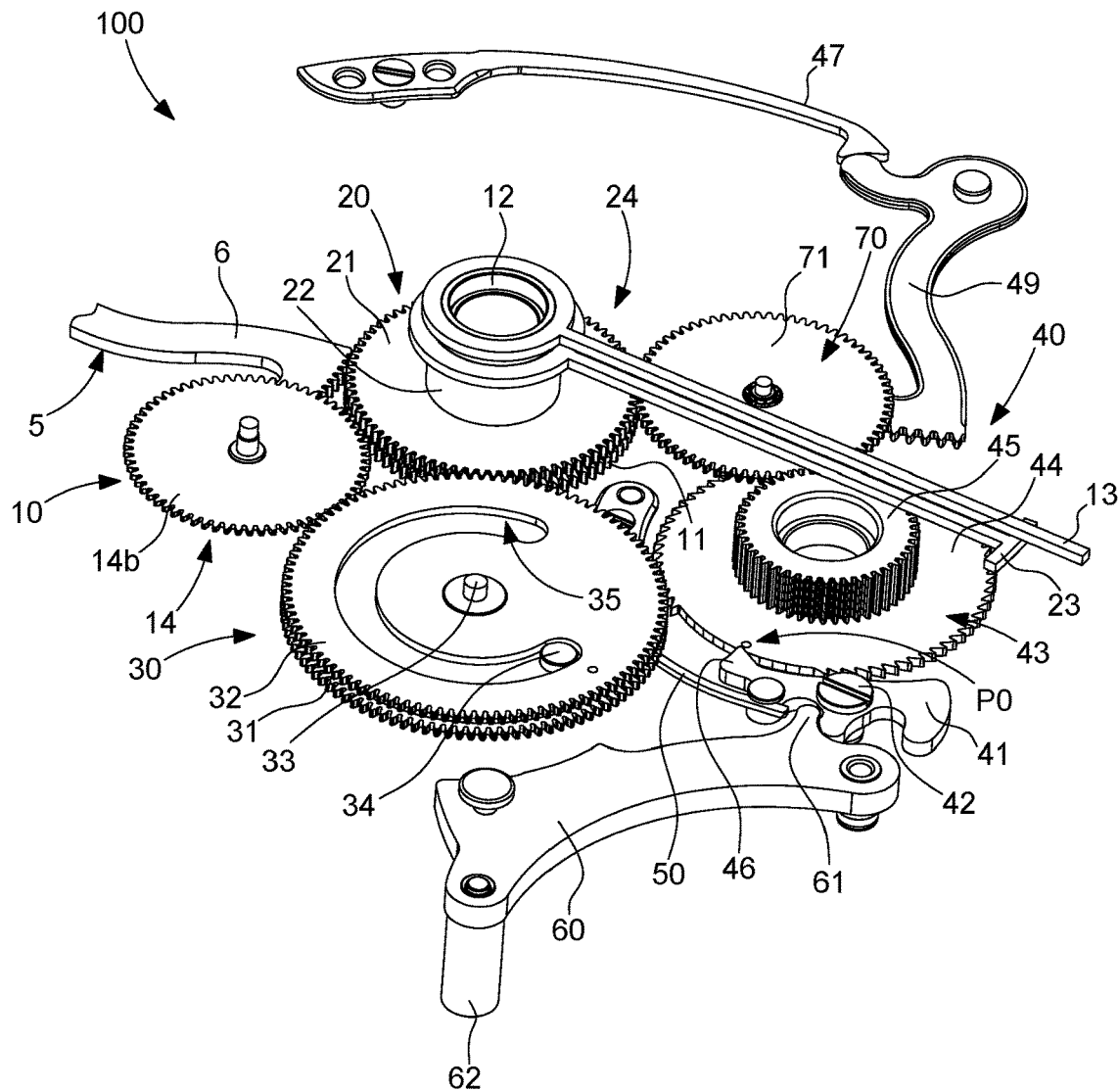
FIG. 1 is a representation in perspective of one example of embodiment of the timepiece mechanism according to the invention.
Figure 2:
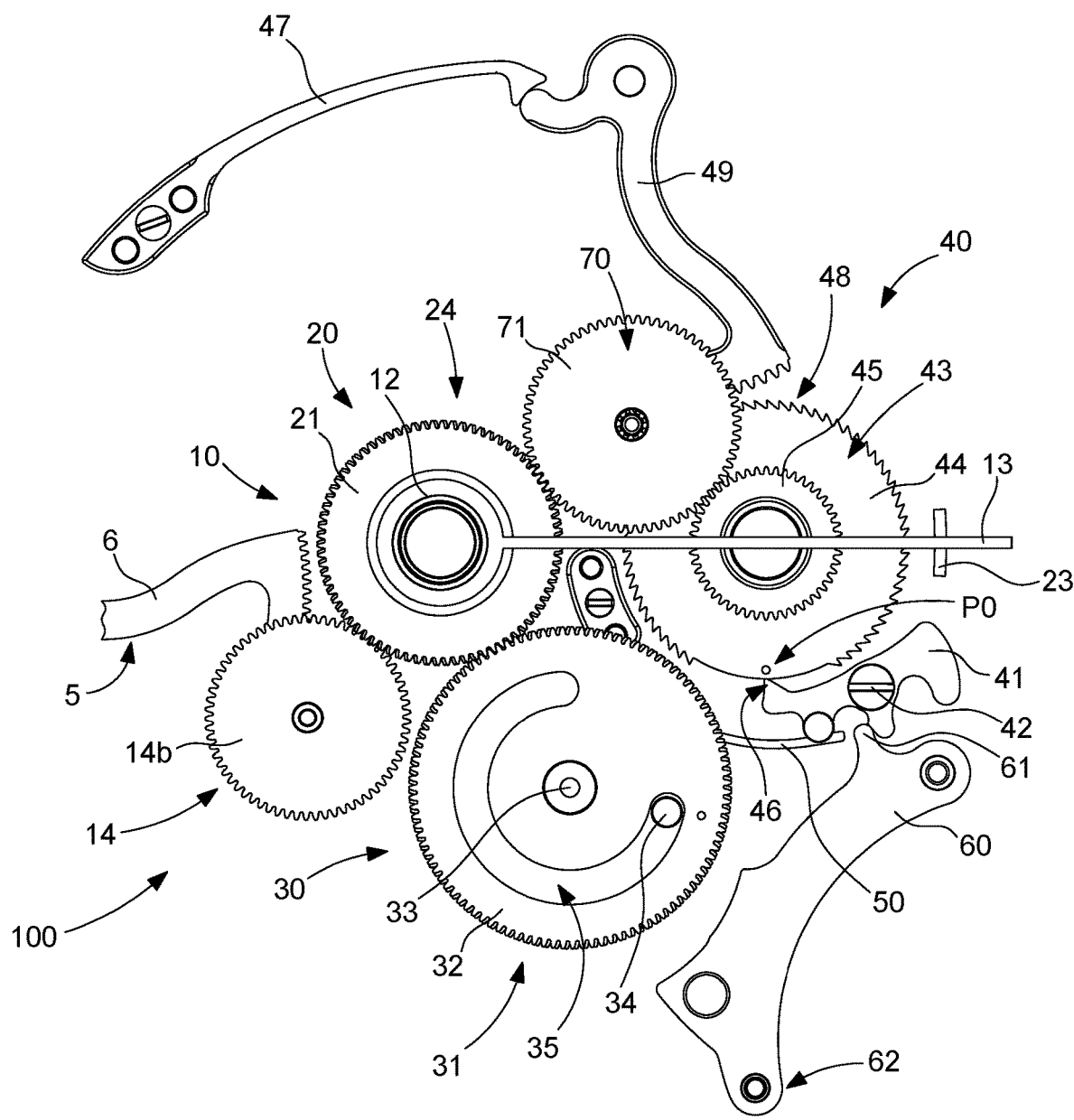
FIG. 2 is a representation in top view of the example of embodiment of the timepiece mechanism according to the invention illustrated in FIG. 1.
Figure 3:
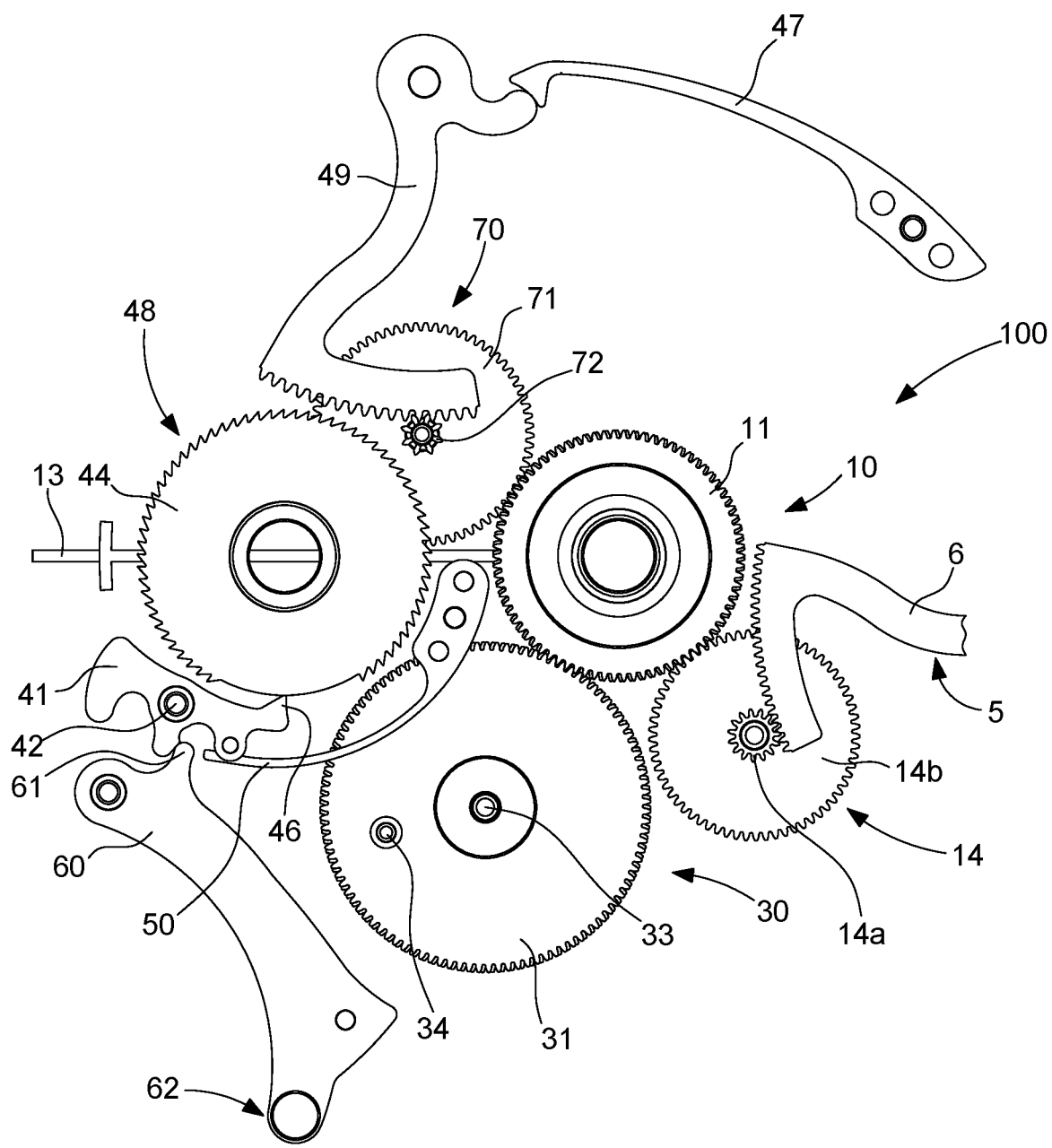
FIG. 3 is a representation in bottom view of the example of embodiment of the timepiece mechanism according to the invention illustrated in FIG. 1.

FIG. 1 is a representation in perspective of one example of embodiment of the timepiece mechanism 100. FIGS. 2 and 3 are respectively representations in top view and in bottom view of the example of embodiment of the timepiece mechanism 100 illustrated in FIG. 1.

The timepiece mechanism 100 according to the invention is a mechanism for measuring information relating to a physical variable and for indicating a maximum value reached of this measured information.

More particularly, the timepiece mechanism 100 according to the invention is a mechanism for measuring information relating to a physical variable via a mechanical device and for indicating a maximum value reached of this measured information.

The timepiece mechanism 100 according to the invention has a particularly interesting application in depth gauges, or timepieces, such as diving watches, for measuring the ambient pressure and indicating the maximum value reached, particularly during dives.

However, the timepiece mechanism 100 according to the invention also applies to an altimeter, or to a barometer, for measuring the ambient pressure and indicating the maximum value reached in the form for example of an altitude, particularly useful during ascents.

In the remainder of the application, a timepiece mechanism 100 for measuring the ambient pressure and indicating the maximum pressure reached will be taken as example of embodiment. Of course, the invention is not limited to this particular embodiment.

Indeed, the invention also applies to other types of information relating to a physical variable that can be measured by a timepiece mechanism comprising means for measuring this information, such as for example an acceleration, a deceleration, a force, a torque, a magnetic field, a radioactive field or also exposure times to these magnetic or radioactive fields.

With reference to FIGS. 1 to 3, the timepiece mechanism 100 comprises a measured pressure indication train 10 particularly comprising a measured pressure indication wheel 11, integral with an arbor 12 pivotally mounted on a frame (not shown).

The measured pressure indication wheel 11 is kinematically connected to the ambient pressure measuring device 5.

The ambient pressure measuring device 5 comprises an element (not shown) configured to mechanically deform under the effect of a variation of the ambient pressure.

The element configured to mechanically deform under the effect of a variation of the ambient pressure is for example a deformable flat membrane setting in motion a feeler-spindle.

The element configured to mechanically deform under the effect of a variation of the ambient pressure may also be an aneroid capsule comprising an aneroid box compressing or dilating depending on the ambient pressure.

The ambient pressure measuring device 5 is relatively conventional and is not shown in detail in FIGS. 1 to 3 for a better readability and understanding of the timepiece mechanism 100 according to the invention.

The ambient pressure measuring device 5 is arranged such that the displacements of the element configured to mechanically deform under the effect of a variation of the ambient pressure (deformable flat membrane, or aneroid capsule), are transmitted to the measured pressure indication wheel 11, in the form of a rotation of the first arbor 12, by means of a transmission mechanism, such that the angular position of the measured pressure indication wheel 11 depends on the ambient pressure measured by the pressure measuring device.

By way of example, the transmission mechanism of the ambient pressure measuring device may comprise a rack 6 at the end of the kinematic chain, directly meshing the measured pressure indication wheel 11, or an intermediate wheel assembly 14 positioned between the measured pressure indication wheel 11 and the rack 6 of the transmission mechanism of the ambient pressure measuring device 5, as shown in FIGS. 1 to 3.

In the example of embodiment illustrated in FIGS. 1 to 3, the intermediate wheel assembly 14 comprises an intermediate pinion 14a meshed with the rack 6 of the transmission mechanism and an intermediate wheel 14b, integral with the intermediate pinion 14a, meshed with the measured pressure indication wheel 11.

The measured pressure indication wheel 11 may be integral with a measured pressure indicator organ 13 making it possible for the user to see the ambient pressure measured by the measuring device. The measured pressure indicator organ 13 is for example a hand integrally mounted on the arbor 12 of the measured pressure indication wheel 11.

The timepiece mechanism 100 also comprises a maximum pressure indication mechanism 20 making it possible for example to indicate the maximum depth reached during one or more dives, so long as the maximum pressure indication mechanism 20 is not reset to zero.

Such a maximum pressure indication mechanism 20 comprises a maximum pressure display train 24, comprising at least one maximum pressure display wheel 21, integral with an arbor 22 pivotally mounted on the frame. The maximum pressure display train 24 is kinematically connected to the measured pressure indication train 10.

In the example of embodiment illustrated in FIGS. 1 to 3, the maximum pressure display wheel 21 is coaxially mounted with the measured pressure indication wheel 11, such that the two wheels 21, 11 are superposed. Thus, the arbor 22 of the maximum pressure display wheel 21 is concentric with the arbor 12 of the measured pressure indication wheel 11. However, it is also envisaged to be able to position the maximum pressure display wheel 21 and the measured pressure indication wheel 11 non-coaxially without departing from the context of the invention.

In the example of embodiment illustrated in FIGS. 1 to 3, the maximum pressure display wheel 21 and the measured pressure indication wheel 11 are centred in relation to the centre of the mechanism. However, it is also envisaged to be able to position the maximum pressure display wheel 21 and the measured pressure indication wheel 11 eccentrically in relation to the centre of the mechanism according to the invention, and particularly in relation to the centre of a horological movement integrating a mechanism according to the invention, in such a way as to be able to display information relating to the pressure outside of a central area of the horological movement generally dedicated to indicating time information.

The maximum pressure display wheel 21 is integral with a maximum pressure indicator organ 23, for example a hand integrally mounted on the arbor 22.

The maximum pressure display wheel 21 is capable of being driven gradually by the measured pressure indication train 10, or by a wheel assembly kinematically connected to the measured pressure indication train 10.

To this end, the timepiece mechanism 100 comprises a drive mechanism 30 comprising a first wheel assembly 31 meshed with the measured pressure indication wheel 11. The first wheel assembly 31 is integral with an arbor 33 pivotally mounted on the frame.

Thus, the first wheel assembly 31 of the drive mechanism 30 is rotated by the measured pressure indication wheel 11, depending on variations of the ambient pressure.

The drive mechanism 30 also comprises a second wheel assembly 32 freely mounted about the arbor 33 of the first wheel assembly 31 and meshed with the maximum pressure display wheel 21. The second wheel assembly 32 is therefore coaxial with the first wheel assembly 31.

The first wheel assembly 31 is a driver wheel assembly configured to gradually drive the second wheel assembly 32 during an increase of the ambient pressure, measured by the pressure measuring device and depending on the relative position of the second wheel assembly 32 in relation to the first wheel assembly 31. The second wheel assembly 32 is therefore a follower wheel assembly.

The drive mechanism 30 is configured to make it possible to advance the angular position of the second wheel assembly 32 when the angular position of the first wheel assembly 31 becomes greater than the angular position of the second wheel assembly 32.

The driving of the second wheel assembly 32 by the first driver wheel assembly 31 is performed by means of a drive pin 34 integral with the first wheel assembly 31.

The drive pin 34 is pushed in the first wheel assembly 31 and protrudes in relation to the plate of the first wheel assembly 31. The drive pin 34 is configured to be able to move inside an opening 35 arranged in the body of the second wheel assembly 32 and to be able to drive the second wheel assembly 32 when the drive pin 34 abuts against one end of the opening 35.

The opening 35 has an arc of circle shape the angular extent of which is configured substantially depending on the angular travel of the measured pressure indication wheel 11.

Thus, the first wheel assembly 31 can pivot freely without driving the second wheel assembly during a reduction of the ambient pressure and when the ambient pressure remains lower than the maximum pressure corresponding to the effective position of the second wheel assembly 32.

The drive mechanism 30 operates in the following way. When the organs for indicating the ambient pressure 13 and the maximum pressure 23 are in a reference position (theoretical zero) the two wheel assemblies 31 and 32 are also in their initial reference position. In this case, the drive pin 34 abuts against one end of the opening 35 of the second wheel assembly 32, as illustrated by FIG. 3.

During an increase of the ambient pressure measured by the ambient pressure measuring device 5, the first wheel assembly 31 is rotated and pivots according to a first direction of rotation (for example in the anticlockwise direction). The two wheel assemblies being respectively in the same reference position, the rotation of the first wheel assembly 31 also drives the rotation of the second wheel assembly 32, the drive pin 34 abutting against one end of the opening 35. The second wheel assembly 32 is thus driven in an angular position corresponding to the measured pressure.

During a reduction of the ambient pressure, the first wheel assembly 31 pivots in the opposite direction (for example in the clockwise direction according to the architecture shown in FIGS. 1 to 3). The drive pin 34 then moves freely inside the opening 35. The first wheel assembly 31 can thus freely return in an earlier angular position or in its initial reference position when the pressure is again zero (for example outside of the water) without driving the second wheel assembly 32 that remains indexed in an angular position corresponding to the maximum pressure measured during the pressure increase described above.

When the ambient pressure increases again, the second wheel assembly 32 will be rotated by the first wheel assembly 31 when the measured pressure will become greater than the maximum pressure, corresponding to the effective angular position of the second wheel assembly 32, that is to say when the drive pin 34 of the first wheel assembly 31 will come back to abut against the end of the opening 35.

Thus, the angular position of the second wheel assembly 32 corresponds to the maximum value of the pressure measured by the ambient pressure measuring device 5, so long as it is not reset to zero by the zero-reset lever that will be described subsequently.

The angular position of the second wheel assembly 32, and therefore of the maximum pressure display wheel 21, is maintained at each advance by means of an uncouplable indexing mechanism 40, in such a way as to index the angular position of the second wheel assembly 32 corresponding to the maximum measured value of the ambient pressure, since the last zero-reset of the mechanism.

The uncouplable indexing mechanism 40 is configured to block the angular position of the maximum pressure display wheel 21 at each advance of it, during phases of increase of the ambient pressure, such that the maximum pressure display wheel 21 remains indexed during a reduction of the ambient pressure.

The uncouplable indexing mechanism 40 comprises an uncouplable blocking organ, for example an indexing jumper 41, rotatable about a pivot 42 integral with the frame, between a coupled position and an uncoupled position.

The indexing jumper 41 cooperates with an indexing wheel assembly 43 comprising an indexing toothed wheel 44 and a central indexing pinion 45, integral with the indexing toothed wheel 44. The central indexing pinion 45 is kinematically connected to the maximum pressure display wheel 21.

The indexing toothed wheel 44 cooperates with the indexing jumper 41, and more particularly with a jumper beak 46, in such a way as to block the position of the maximum pressure display wheel 21, by means of the central indexing pinion 45, at each advance of the maximum pressure display wheel 21.

The indexing toothed wheel 44 has an asymmetric toothing 48, for example a wolf-tooth toothing, comprising a plurality of indexing teeth, in such a way as to make possible a clear indexing without clearance and without backward return possible of the maximum pressure display wheel 21, particularly thanks to the straight flanks of the teeth of the asymmetric toothing 48.

However, according to alternative embodiments it is possible to use another type of toothing.

The indexing jumper 41 cooperates with a spring blade 50 exerting a force on the indexing jumper 41 in such a way as to position it by default in its coupled position and to ensure the positioning of the indexing jumper 41, and more particularly the jumper beak 46, at the tooth bottom of the toothing of the indexing toothed wheel 44.

The indexing toothed wheel 44 has a reference indexing position corresponding for example to the theoretical zero of the pressure measured by the ambient pressure measuring device 5. In such a way as to easily see this reference indexing position, the indexing toothed wheel 44 advantageously has an indexing symbol or marking, referenced P0, arranged on the plate of the indexing toothed wheel 44. When this indexing symbol is positioned opposite the jumper beak 46, the indexing toothed wheel 44 is in its reference indexing position, as illustrated in FIG. 1.

As shown in FIGS. 1 to 4, the indexing toothed wheel 44 may have a toothed sector less than 360° such that it may comprise one, or more, areas, known as non-indexing, that are characterised by one, or more, smooth angular portions, i.e. devoid of at least one indexing tooth, and preferably of a plurality of indexing teeth. Advantageously, these non-indexing areas make it possible to render the indexing function inactive on certain angular portions of the indexing toothed wheel 44, in such a way as to not index the position of the maximum pressure indicator organ 23, over certain ambient pressure value ranges, corresponding to certain situations predefined by the designer.

Advantageously, the indexing toothed wheel 44 comprises at least one angular sector, devoid of at least one tooth or a plurality of indexing teeth, located close to the indexing symbol, referenced P0, such that the indexing toothed wheel 44 has a portion devoid of indexing teeth close to its reference indexing position in relation to the jumper beak 46.

Advantageously, the indexing toothed wheel 44 comprises a first angular sector Z1 without indexing teeth positioned in such a way as to render the indexing inactive during small pressure variations, beyond the theoretical zero, for example for variations of the ambient pressure measured during a dive of less than a few metres, for example of less than 1 m, or to prevent indexing the maximum pressure indicator organ 23 during slight modifications of the atmospheric pressure.

Figure 4:
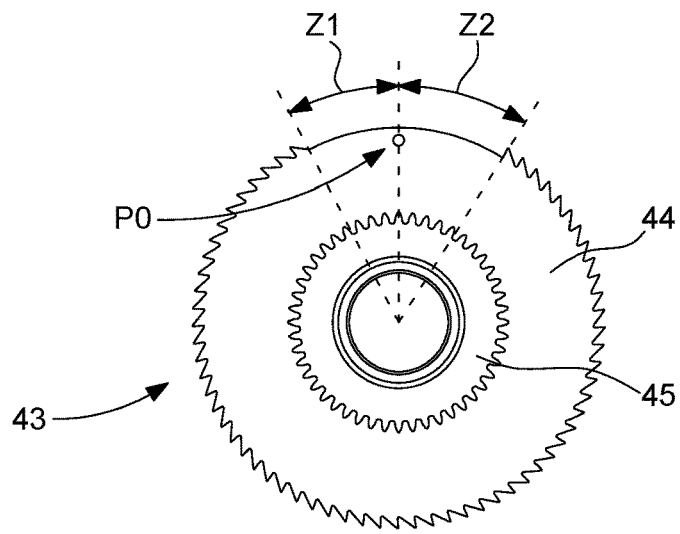
FIG. 4 is a representation in top view of the indexing wheel assembly of the example of embodiment of the timepiece mechanism according to the invention, illustrated in FIG. 1.

For example, and according to the example of embodiment illustrated in FIGS. 1 to 4, the first angular sector Z1, devoid of at least one indexing tooth, is typically positioned between the indexing symbol P0 and the inclined flank of a first tooth of the asymmetric toothing 48, as symbolised in FIG. 4.

Advantageously, the indexing toothed wheel 44 may also comprise a second angular sector Z2 without indexing teeth positioned in such a way as to render the indexing inactive when the ambient pressure exceeds the maximum value of the display dedicated to the maximum pressure, for example a display appearing on a dial. Thus, the position of the maximum depth indicator organ 23 may not be indexed in a position located beyond the maximum value provided by the display.

Thus, in our preceding example, the second angular sector Z2 devoid of at least one indexing tooth is positioned after the straight flank of a last tooth corresponding to the last desired indexing position, or between the indexing symbol P0 and the straight flank of a last tooth of the asymmetric toothing 48, as symbolised in FIG. 4.

The zero-reset of the maximum pressure display train 24 is ensured by a zero-reset lever 60 that can be manipulated by the user via a push-piece, or an actuation stud 62.

The zero-reset lever 60 comprises a finger-piece 61 capable of forming a pivoting yoke of the indexing jumper 41. The actuation by the user of the zero-reset lever 60 must overcome the return force of the spring blade 50 to make possible the pivoting of the indexing jumper 41 and its disengagement from the toothing of the indexing toothed wheel 44.

The uncouplable indexing mechanism 40 also comprises a return organ 49, for example a return rack, cooperating with a return element 47 capable of exerting a return force on the return organ 49. The return organ 49 is kinematically connected to the maximum pressure display train 24, and more particularly to the maximum pressure display wheel 21. Thus, the return organ 49 makes it possible to tension the maximum pressure display train 24 and the drive mechanism 30, which makes it possible to prevent fluttering of the maximum pressure indicator organ 23, caused by the operating clearances existing between the various gears of the train.

Via the return element 47, the return organ 49 also exerts a return force on the maximum pressure display wheel 21 capable of repositioning the maximum pressure display wheel 21 and the maximum pressure indicator organ 23 in a reference position, for example the theoretical zero, when the indexing jumper 41 is in uncoupled position.

The return element 47 is for example a return spring.

As seen above, the indexing wheel assembly 43 is kinematically connected to the maximum pressure display wheel 21.

According to a first alternative embodiment, not illustrated, the indexing wheel assembly 43 is directly meshed with the maximum pressure display wheel 21, for example by means of the central indexing pinion 45, such that a first gear train T1 is formed between the maximum pressure display wheel 21 and the indexing wheel assembly 43.

According to a second alternative embodiment, illustrated more particularly in FIGS. 1 to 3, the uncouplable indexing mechanism 40 further comprises an intermediate indexing disc 70 positioned between the indexing wheel assembly 43 and the maximum pressure display wheel 21, such that the indexing wheel assembly 43 is kinematically connected to the maximum pressure display wheel 21 by means of this intermediate indexing wheel assembly 70. In this alternative embodiment, the maximum pressure display wheel 21, the intermediate indexing wheel assembly 70 and the indexing wheel assembly 43 form a second gear train T2.

Regardless of the alternative embodiment, the various gears constituting the gear trains T1 or T2 are configured such that the gear ratio, resulting between the maximum pressure display wheel 21 and the indexing wheel assembly 43, is a multiplication ratio.

Thus, with a multiplication ratio between the maximum pressure display wheel 21 and the indexing wheel assembly 43, the mechanism according to the invention makes it possible to increase the possible indexing positions of the maximum pressure indicator organ 23, which makes it possible to increase the maximum pressure display resolution.

The use of a multiplication ratio between the maximum pressure display wheel 21 and the indexing wheel assembly 43 particularly makes it possible to get closer to the display and accuracy results of a friction drive mechanism while proposing a mechanism of simpler design with an optimised and reduced compactness.

The use of an intermediate indexing wheel assembly 70 advantageously makes it possible to produce an intermediate wheel in such a way as to offset the indexing wheel assembly 43 outside of an area close to the arbor 22 of the maximum pressure display wheel 21. Thus, the installation of various elements of the maximum pressure indication mechanism 20 is facilitated and the thickness of the mechanism is minimised. Advantageously, the intermediate indexing wheel assembly 70 makes it possible to offset the indexing wheel assembly 43 from the central region of the mechanism that generally comprises an accumulation of indicator organs on the same arbor. Thus, the installation is facilitated and the overall thickness of the mechanism is minimised according to the invention, and particularly of a horological movement integrating such a mechanism.

More particularly, the intermediate indexing wheel assembly 70 comprises an intermediate indexing wheel 71 meshed on the one hand with the maximum pressure display wheel 21 and meshed on the other hand with the central indexing pinion 45 of the indexing wheel assembly 43.

The intermediate indexing wheel assembly 70 also comprises an intermediate indexing pinion 72 (that can be seen in FIG. 3). In the example of embodiment illustrated in FIGS. 1 to 3, the return organ 49 is meshed with an intermediate indexing pinion 72 in such a way as to apply the return force on the maximum pressure display train 24. Such an installation advantageously makes it possible to reduce the angular travel of the return organ 49, and thus facilitate the installation of various elements of the mechanism according to the invention.

However, other constructions are possible without departing from the context of the invention.

According to one alternative embodiment, the return organ 49 may cooperate for example with the indexing wheel assembly 43, and be meshed on the central indexing pinion 45 of the indexing wheel assembly 43.

By way of example, the indexing wheel assembly 43 comprises 62 machined teeth, which corresponding to an indexing wheel assembly comprising 73 teeth over at total circumference of 360°.

Thus, in the example of embodiment presented, the indexing wheel assembly 43 makes it possible to perform 62 indexing positions of the maximum pressure indicator organ 23. Thus, it is possible to have a more precise resolution in the display of the maximum pressure reached.

The timepiece mechanism 100 according to the invention may be combined with a horological movement configured to indicate information relating to time information.

The invention also relates to a depth gauge, an altimeter or a barometer integrating such a timepiece mechanism 100, as described above.

The invention also relates to a timepiece, such as a diving watch, comprising a horological movement comprising such a timepiece mechanism for measuring information relating to the ambient pressure and for indicating the maximum pressure reached.

The invention claimed is:

1. A timepiece mechanism (100) comprising:
an ambient physical variable measuring device (5) comprising an element configured to mechanically deform under the effect of a variation of said physical variable;
a physical variable measured value indication train (10) kinematically linked to the physical variable measuring device, in such a way as to be rotated under the effect of a variation of the ambient value of the physical variable;
a physical variable maximum value indication mechanism (20) comprising a physical variable maximum value display train (24) comprising a physical variable maximum value display wheel (21), said physical variable maximum value indication mechanism (20) comprising a physical variable maximum value indicator organ (23) integral with the physical variable maximum value display wheel (21);
a drive mechanism (30) configured to gradually drive the physical variable maximum value display train (24) during an increase of the ambient physical variable;
an indexing mechanism (40) to index the position of the physical variable maximum value display train (24) at each advance, the indexing mechanism (40) comprising a blocking organ (41) contacting and cooperating with an indexing wheel assembly (43);
wherein the indexing wheel assembly (43) is kinematically connected to the physical variable maximum value display wheel (21) by a gear train and in that the gear ratio of the gear train between the physical variable maximum value display wheel (21) and the indexing wheel assembly (43) is a multiplication ratio.

2. The timepiece mechanism (100) according to claim 1, wherein the indexing mechanism (40) comprises an intermediate indexing wheel assembly (70) inserted between the physical variable maximum value display wheel (21) and the indexing wheel assembly (43) such that said gear train is formed by the cooperation between the physical variable maximum value display wheel (21), the intermediate indexing wheel assembly (70) and the indexing wheel assembly (43).

3. The timepiece mechanism (100) according to claim 2, wherein the indexing wheel assembly (43) comprises a central indexing pinion (45) meshed with the intermediate indexing wheel assembly (70), such that said gear train is formed by the cooperation between the physical variable maximum value display wheel (21), the intermediate indexing wheel assembly (70) and the central indexing pinion (45).

4. The timepiece mechanism (100) according to claim 3, wherein the indexing wheel assembly (43) comprises an indexing toothed wheel (44) integral with the central indexing pinion (45).

5. The timepiece mechanism (100) according to claim 4, wherein said indexing toothed wheel (44) comprises an asymmetric toothing (48), said blocking organ (41) cooperating with the asymmetric toothing (48) of the indexing toothed wheel (44).

6. The timepiece mechanism (100) according to claim 4, wherein said indexing toothed wheel (44) comprises a toothed sector less than 360°, such that said indexing toothed wheel (44) comprises at least one angular sector (Z1, Z2) devoid of at least one indexing tooth.

7. The timepiece mechanism (100) according to claim 6, wherein said at least one angular sector (Z1, Z2) devoid of at least one indexing tooth is positioned close to a reference indexing position (PO) of the indexing wheel assembly (43).

8. The timepiece mechanism (100) according to claim 1, wherein said blocking organ (41) is a blocking organ that can be uncoupled via a zero-reset lever (60).

9. The timepiece mechanism (100) according to claim 1, wherein the indexing mechanism (40) comprises a return organ (49) configured to ensure a repositioning of the physical variable maximum value display train (24) under the effect of a return element (47).

10. The timepiece mechanism (100) according to claim 9, wherein the return organ (49) cooperates with the indexing wheel assembly (43).

11. The timepiece mechanism (100) according to claim 2, wherein the indexing mechanism (40) comprises a return organ (49) configured to ensure a repositioning of the physical variable maximum value display train (24) under the effect of a return element (47), the return organ (49) cooperating with the intermediate indexing wheel assembly (70).

12. The timepiece mechanism (100) according to claim 11, wherein the return organ (49) cooperates with the intermediate indexing pinion (72) of the intermediate indexing wheel assembly (70).

13. The timepiece mechanism (100) according to claim 1, wherein the drive mechanism (30) comprises a first wheel assembly (31), known as driver wheel assembly, integral with an arbor (33), meshed with the physical variable measured value indication train (10), and a second wheel assembly (32), known as follower wheel assembly, freely mounted about the arbor (33) of the first wheel assembly (31), said second wheel assembly (32) being meshed with the physical variable maximum value indication train (24), said first wheel assembly (31) being configured to drive the second wheel assembly (32) during an increase of the value of the ambient physical variable.

14. The timepiece mechanism (100) according to claim 13, wherein the drive mechanism (30) comprises a drive pin (34) integral with the first wheel assembly (31) cooperating with an opening (35) arranged in the second wheel assembly (32).

15. The timepiece mechanism (100) according to claim 1, wherein the timepiece mechanism comprises:
- an ambient pressure measuring device (5) comprising an element configured to mechanically deform under the effect of a pressure variation;
- a measured pressure indication train (10) kinematically linked to the pressure measuring device, in such a way as to be rotated under the effect of a variation of the ambient pressure;
- a maximum pressure indication mechanism (20) comprising a maximum pressure display train (24) comprising a maximum pressure display wheel (21), said maximum pressure indication mechanism (20) comprising a maximum pressure indicator organ (23) integral with the maximum pressure display wheel (21);
- a drive mechanism (30) configured to gradually drive the maximum pressure display train (24) during an increase of the ambient pressure;
- an indexing mechanism (40) to index the position of the maximum pressure display train (24) at each advance, the indexing mechanism (40) comprising a blocking organ (41) cooperating with an indexing wheel assembly (43);
- wherein the indexing wheel assembly (43) is kinematically connected to the maximum pressure display wheel (21) by a gear train and in that the gear ratio of the gear train between the maximum pressure display wheel (21) and the indexing wheel assembly (43) is a multiplication ratio.

16. A depth gauge comprising said timepiece mechanism (100) according to claim 1.

17. A altimeter comprising said timepiece mechanism (100) according to claim 1.

18. A horological movement comprising said timepiece mechanism (100) according to claim 1.

19. A timepiece comprising said horological movement according to claim 18.

\* \* \* \* \*